United States Patent
Ohshita et al.

(10) Patent No.: US 9,463,686 B2
(45) Date of Patent: Oct. 11, 2016

(54) UTILITY VEHICLE

(71) Applicant: KAWASAKI JUKOGYO KABUSHIKI KAISHA, Hyogo (JP)

(72) Inventors: Yuji Ohshita, Osaka (JP); Takuma Nozaki, Aioi (JP); Hiroshi Nakatani, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/585,545

(22) Filed: Dec. 30, 2014

(65) Prior Publication Data

US 2016/0185203 A1 Jun. 30, 2016

(51) Int. Cl.
*B60K 1/00* (2006.01)
*B60K 5/12* (2006.01)
*B60K 11/06* (2006.01)

(52) U.S. Cl.
CPC ............. *B60K 5/1208* (2013.01); *B60K 11/06* (2013.01)

(58) Field of Classification Search
CPC .. B60K 5/1208; B60K 5/1441; B60K 11/06; B60K 6/52; B60K 26/04; B60K 1/00
See application file for complete search history.

(56) References Cited

U.S. PATENT DOCUMENTS

| | | | | |
|---|---|---|---|---|
| 4,785,691 A * | 11/1988 | Papenhagen | ........... | B60K 26/04 123/342 |
| 6,729,298 B1 * | 5/2004 | Sterr | ........................ | G05G 1/46 123/339.13 |
| 6,761,145 B2 * | 7/2004 | Matsuda | ............... | F02D 9/1065 123/342 |
| 7,017,552 B2 * | 3/2006 | Gerhardy | ................ | F02D 11/04 123/400 |
| 7,343,896 B2 * | 3/2008 | Grant | ..................... | F02M 11/02 123/336 |
| 8,166,950 B2 * | 5/2012 | Scheuerell | ............ | F02D 9/1065 123/337 |
| 8,517,136 B2 * | 8/2013 | Hurd | .................... | B60K 5/1241 180/233 |
| 8,727,063 B1 | 5/2014 | Yamamoto et al. | | |
| 8,944,449 B2 * | 2/2015 | Hurd | ........................ | B60K 5/00 280/124.106 |
| 9,074,535 B1 * | 7/2015 | Huibregtse | .............. | F02M 3/06 |
| 2009/0301830 A1 * | 12/2009 | Kinsman | .............. | B60G 15/063 188/289 |
| 2013/0313035 A1 * | 11/2013 | Jenkins, Jr. | .............. | B60K 6/52 180/243 |

\* cited by examiner

*Primary Examiner* — Hau Phan
(74) *Attorney, Agent, or Firm* — Wenderoth, Lind & Ponack, L.L.P.

(57) ABSTRACT

A utility vehicle includes: a chassis frame, a cargo bed, a cabin, and an engine. The utility vehicle further includes: a torque rod bracket fixed to an engine body forming a shell or outline of the engine and projecting upward from an upper end of the engine body; and a torque rod provided at a position higher than the upper end of the engine body and coupling the torque rod bracket and a frame member provided at one end in a vehicle width direction of the engine.

10 Claims, 8 Drawing Sheets

UTILITY VEHICLE

BACKGROUND OF THE INVENTION

1. Field of the Invention

The present invention relates to a utility vehicle, and particularly to a mounting structure for an engine mounted to the utility vehicle.

2. Description of the Prior Art

U.S. Pat. No. 8,727,063 discloses a utility vehicle that includes an engine supported by a chassis frame at two positions in a front-rear direction of the vehicle. The utility vehicle further includes a torque rod that is bridged between an engine body and a frame member provided at an end in a vehicle width direction to suppress rolling of the engine in the vehicle width direction.

The torque rod of the utility vehicle described in U.S. Pat. No. 8,727,063 couples the lower half (crankcase) of the engine body and the frame member at an end in the vehicle width direction. The torque rod coupled to the lower half of the engine body has less flexibility in location of the torque rod because the torque rod needs to be located so as not to interfere with other components. The torque rod may be thus occasionally difficult to be coupled to an appropriate position of the engine. The torque rod also requires troublesome attaching work.

SUMMARY OF THE INVENTION

An object of the present invention is to provide a utility vehicle including a torque rod that has wide flexibility in location of the torque rod and can be located with no interference with other members. In order to achieve the object mentioned above, the present invention provides a utility vehicle including a chassis frame, a single or a plurality of seat rows, a cargo bed provided behind the seat rows, a cabin accommodating the seat rows, and an engine mounted to the chassis frame, the utility vehicle further includes: a torque rod bracket fixed to an engine body forming a shell of the engine, the torque rod bracket projecting upward from an upper end of the engine body; and a torque rod provided at a position higher than the upper end of the engine body, the torque rod connecting the torque rod bracket and a frame member, the frame member being provided at one end of the cassis frame in a vehicle width direction.

The torque rod is located above the engine body in the present invention, and thus has wider flexibility in location of the torque rod so as not to interfere with other members. This configuration achieves a long distance between a center of rolling of the engine and the torque rod, and thus suppresses rolling of the engine.

The utility vehicle thus configured according to the present invention can include any of the following configurations.

(a) The engine includes an engine cooling fan at an end in the vehicle width direction, the engine cooling fan is located at an extending side of the torque rod, and the torque rod extends over the engine cooling fan. This configuration achieves location of the torque rod and the cooling fan with no interference therebetween.

(b) The torque rod has each end in an extending direction provided with a pillow ball joint. This configuration facilitates dynamically reasonable coupling of the respective ends of the torque rod to desired positions. This configuration also releases an excess load applied to the torque rod.

(c) The torque rod has one end in an extending direction provided with a pillow ball joint and other end provided with a rubber damper joint. This configuration improves a vibration absorption effect on rolling of the engine.

(d) The engine has each end in a front-rear direction of the vehicle supported by a cross member extending in the vehicle width direction of the chassis frame. This configuration improves a vibration suppression effect on rolling of the engine.

(e) The torque rod bracket is an engine hanger having an engagement portion configured to suspend the engine. This configuration achieves sharing of components to reduce the number of components.

(f) The torque rod extends in the vehicle width direction and has ends in an extending direction coupled to the frame member at one end in the vehicle width direction and a frame member provided at the other end. This configuration improves the vibration suppression effect on rolling of the engine, and also enhances rigidity of the chassis frame supporting the engine.

BRIEF DESCRIPTION OF THE DRAWINGS

The above and other objects, features and advantages of the present invention will be become more apparent from the following description taken in connection with the accompanying drawings, in which.

DETAILED DESCRIPTION OF THE PREFFERED EMBODIMENTS

FIGS. 1 to 6 show a utility vehicle according to the present invention. A preferred embodiment of the present invention will now be described with reference to these figures. For convenience of description in this embodiment, a forward travelling direction of the vehicle is called "front" of the vehicle and each of components of the vehicle, and a right and left direction as seen from a driver or passenger is called "a right and left direction" of the vehicle and each of the components of the vehicle.

Figure 1:
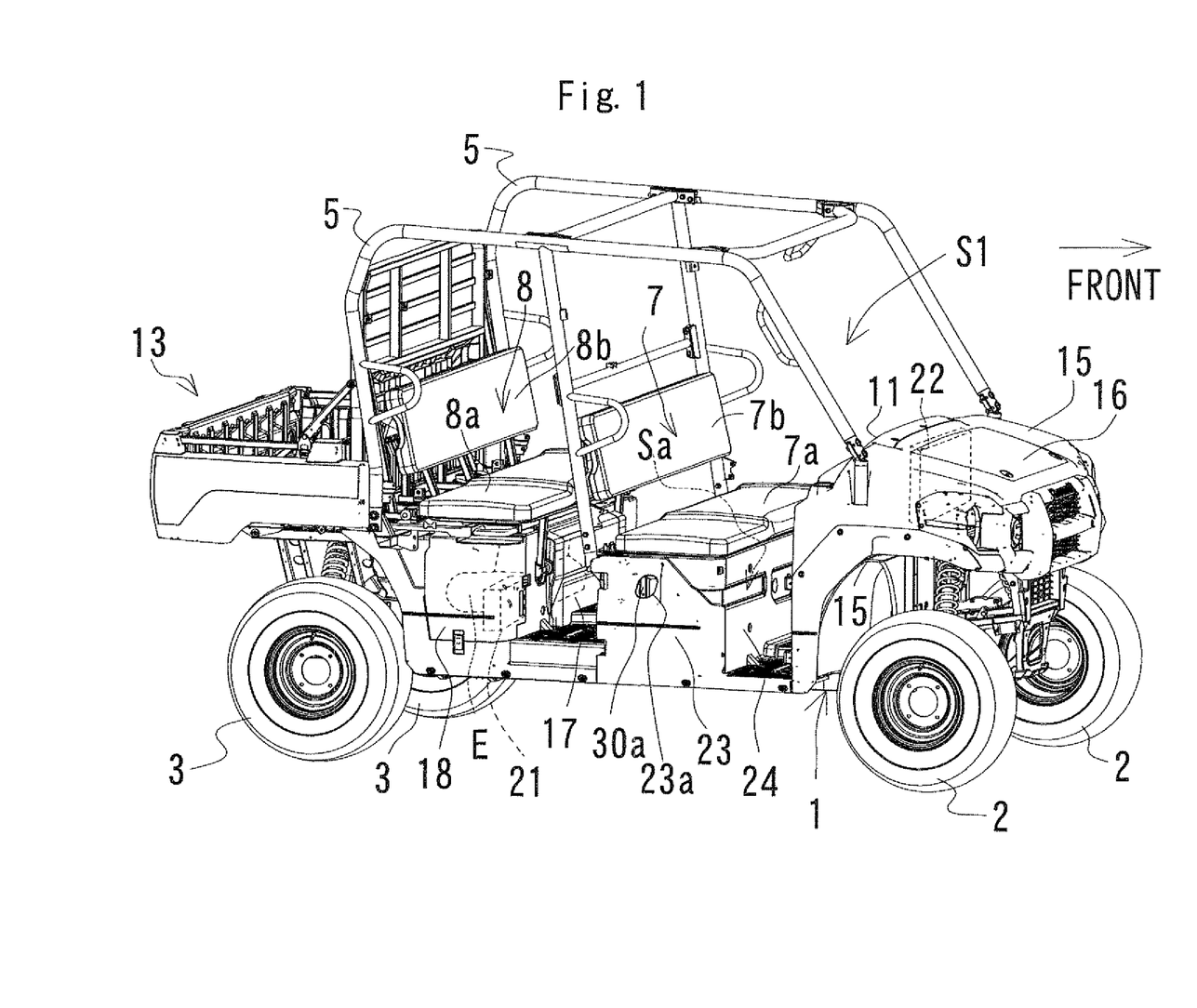
FIG. 1 is a perspective view viewed from upper right, of a utility vehicle according to the present invention.

FIG. 1 is a perspective view of the entire utility vehicle. The utility vehicle includes a chassis frame 1, right and left front wheels 2 located at a front end of the chassis frame 1, and right and left rear wheels 3 located at a rear end of the chassis frame 1. A cabin (riding space) S1 is located between the front wheels 2 and the rear wheels 3 in a front-rear direction, and is surrounded with a R.O.P.S. 5. The cabin S1 accommodates a bench type front sheet 7 and a bench type rear sheet 8. The front seat 7 includes a seat plate 7a and a back rest 7b, whereas the rear seat 8 also includes a seat plate 8a and a back rest 8b. A dash panel (dashboard) 11 is provided at a front end of the cabin Si, and right and left front fenders 15 and a hood (bonnet) 16 are provided in front of the dash panel 11. A dump type cargo bed 13 is provided behind the cabin S1. An engine E is accommodated in a space under the seat plate 8a of the rear seat 8, and is located at a substantial center in a vehicle width direction. The R.O.P.S. is an abbreviation for a rollover protective structure.

Figure 2:
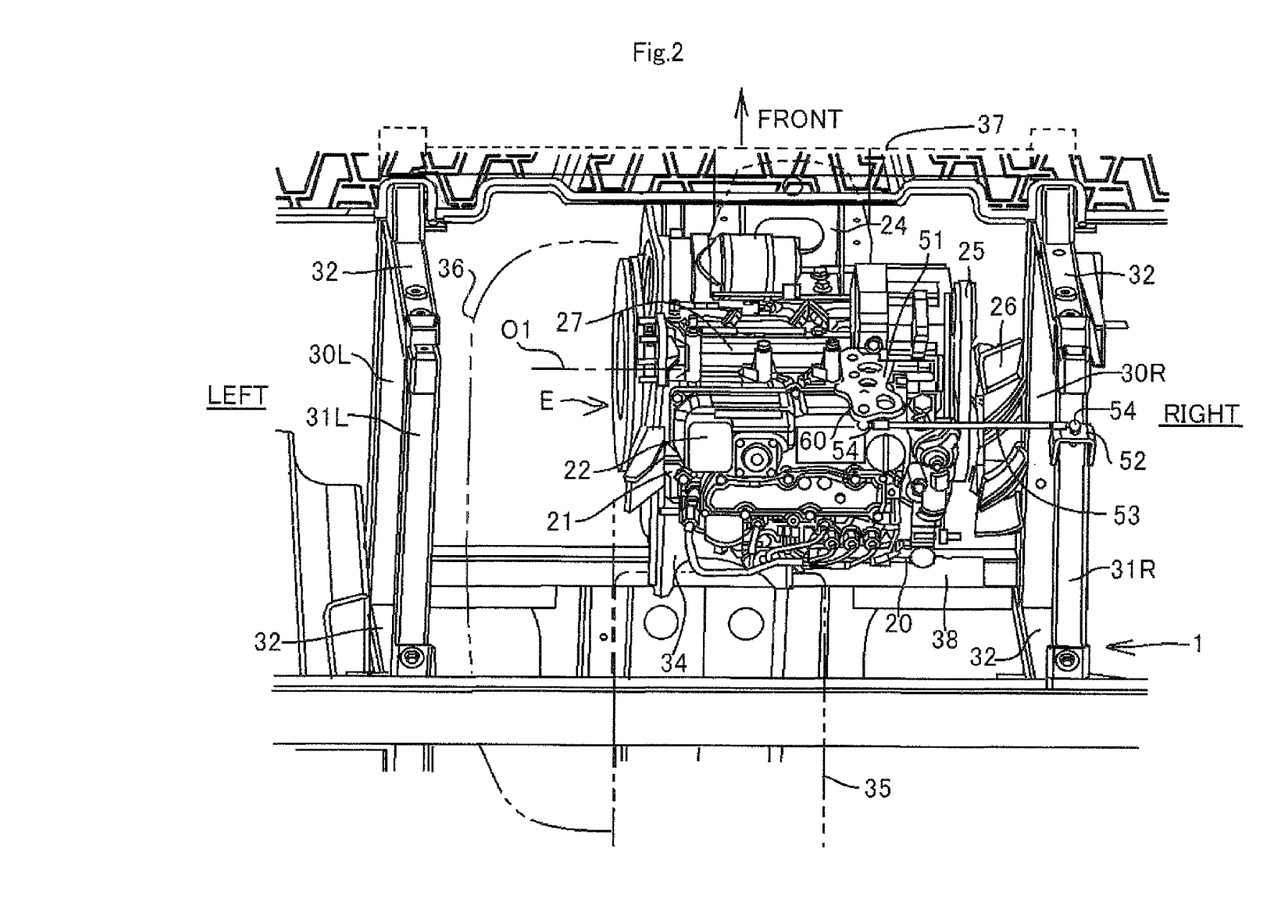
FIG. 2 is a perspective view viewed from above, of an engine of the utility vehicle shown in FIG. 1.

With reference to FIG. 2, the chassis frame 1 includes a pair of right and left main frame members 30R and 30L extending in the front-rear direction, right and left upper frame members 31R and 31L provided above the right and left main frame members 30R and 30L, and a plurality of leg members 32 supporting the right and left upper frame members 31R and 31L. The right and left upper frame members 31R and 31L are located in parallel with the right and left main frame members 30R and 30L. The lower ends of the leg members 32 are supported by the right and left main frame members 30R and 30L. The right and left upper frame members 31R and 31L serve as seat frames for the rear seat.

The engine E according to the present embodiment is a diesel engine of the inline type having a plurality of cylinders, is located between the right and left main frame members 30R and 30L in a planar view, and has a crank axis line O1 extending in the vehicle width direction. A gear type transmission 35 is connected to a rear end of the engine E with a connecting bracket 34 being interposed therebetween. A V-belt continuously variable transmission 36 is coupled from a left side surface of the engine E to a left side surface of the gear type transmission 35.

The engine E has an engine body forming a shell of the engine E. The engine body includes a lower half (not shown) of a crankcase, a cylinder block 20 integrally having an upper half of the crankcase, a cylinder head 21 fastened to an upper end surface of the cylinder block 20, a head cover 22 fastened to an upper end surface of the cylinder head 21, and the like. The cylinder block 20 is provided, at a front end, with a front mounted bracket 24. The connecting bracket 34 is provided at a rear end of the cylinder block 20. The engine body is provided, at a right end, with a fan belt mechanism 25 and an engine cooling fan 26.

The front mounted bracket 24 is fixed to an upper surface of a first cross member 37 coupling the right and left main frame members 30R and 30L each other. The connecting bracket 34 at the rear end of the engine is mounted to an upper surface of a second cross member 38 coupling the right and left main frame members 30R and 30L. The second cross member 38 is located behind the first cross member 37.

The cylinder head 21 is provided, on a front surface, with an exhaust manifold 27 extending long in the vehicle width direction and an engine-side torque rod bracket 51. The engine-side torque rod bracket 51 also serves as an engine hanger. The exhaust manifold 27 extends from a left end of the cylinder head 21 into a right half of the cylinder head 21 through a center of the engine in the vehicle width direction. The engine-side torque rod bracket 51 is located on a right next to the exhaust manifold 27.

A frame-side torque rod bracket 52 is firmly fixed to an upper surface of the right upper frame member 31R by welding. The frame-side torque rod bracket 52 has a U shape and is located at a substantially same position in the front-rear direction as an upper end of the engine-side torque rod bracket 51. A torque rod 53, which is a principal part of the present invention, is bridged between the frame-side torque rod bracket 52 and the upper end of the engine-side torque rod bracket 51. The torque rod 53 is located slightly in front of the crank axis line O1 of the engine E, and extends in the vehicle width direction in parallel with the crank axis line O1. FIG. 2 is a perspective view viewed from upper front, of the engine E, and the upper end of the engine-side torque rod bracket 51 is thus seemed behind the crank axis line O1 in this figure. However, the upper end of the engine-side torque rod bracket 51 is actually located in front of the crank axis line O1 in the front-rear direction.

Figure 3:
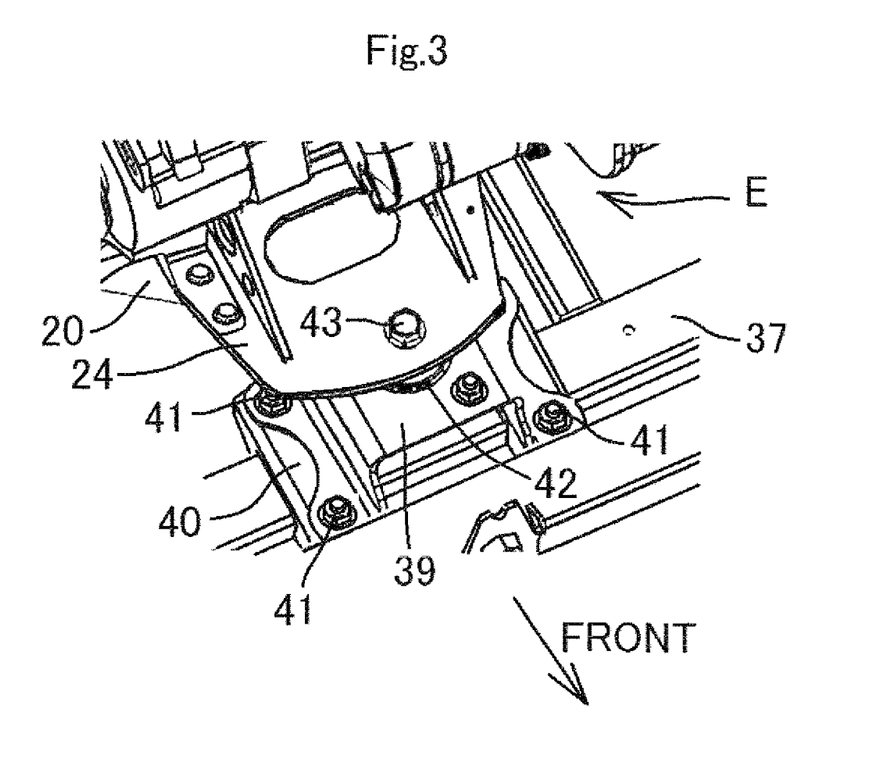
FIG. 3 is a perspective view of a mount portion at the front end of the engine of the utility vehicle shown in FIG. 1.

With reference to FIG. 3, a support member 40 is firmly fixed to a substantial center of the first cross member 37 in the vehicle width direction. A mounting base 39 having an inverse U shape is firmly fixed by a plurality of bolts 41 to an upper surface of the support member 40. The front mounted bracket 24 of the engine E is fixed by a single bolt 43 to an upper surface of the mounting base 39 with a cylindrical damper 42 being interposed therebetween.

Figure 5:
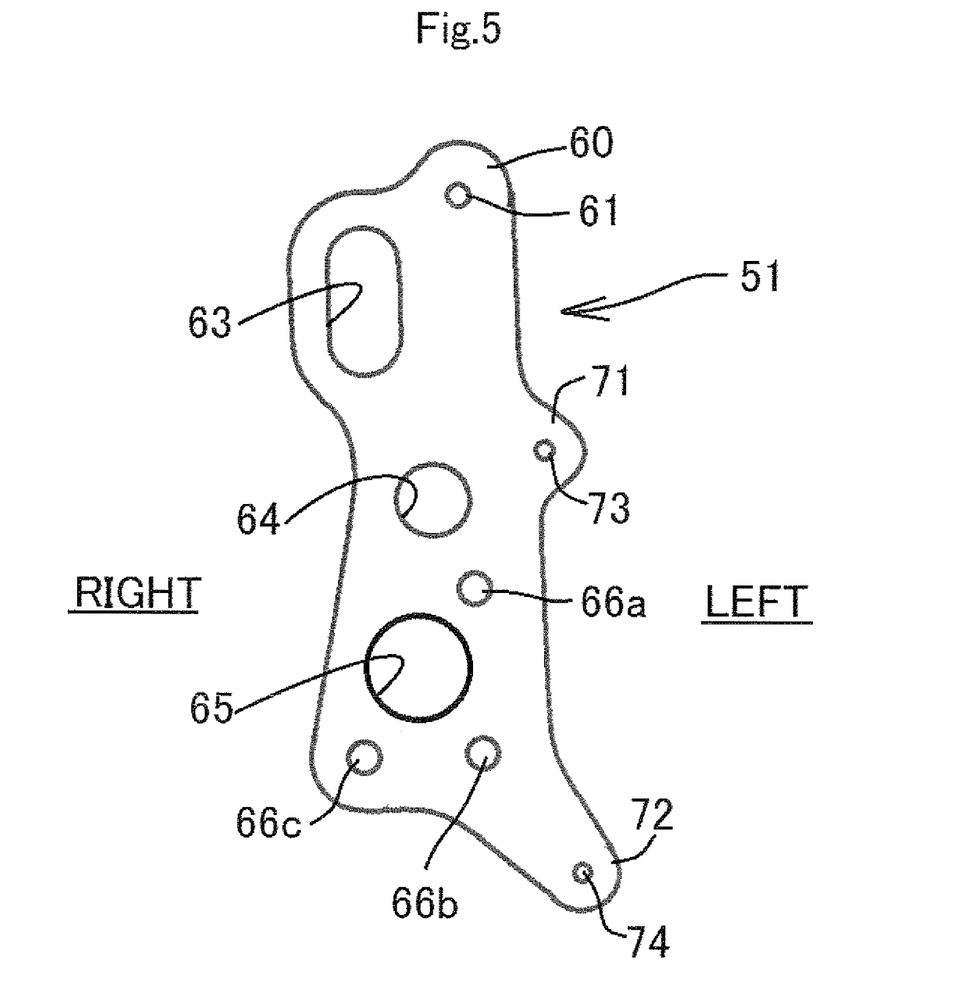
FIG. 5 is an enlarged front view of a torque rod bracket of the utility vehicle shown in FIG. 1.

FIG. 5 is an enlarged view of the engine-side torque rod bracket 51 that also serves as the engine hanger and is made of a thick plate member extending in the vertical direction. The engine-side torque rod bracket 51 is provided, at an upper left end, with a connecting boss portion 60 that is configured to be connected to the torque rod 53. The connecting boss portion 60 projects upward, and has a rod connecting hole 61.

The engine-side torque rod bracket 51 is provided, at an upper right end, with an engagement hole 63 that serves as an engagement portion. The engagement hole 63 is configured to engage a hanging hook and extends long in the vertical direction. The engine-side torque rod bracket 51 is alternatively provided with a ring portion in place of the engagement hole 63, so as to serve as an engine hanger. The engine-side torque rod bracket 51 is provided, at a vertical center, with a first lightening hole 64 having a circular shape. The engine-side torque rod bracket 51 is also provided with a second lightening hole 65 located below the first lightening hole 64. The second lightening hole 65 is larger than the first lightening hole 64. The engine-side torque rod bracket 51 is further provided with a first mounted hole 66a, a second mounted hole 66b and a third mounted hole 66c. The first mounted hole 66a is located at an upper left position with respect to the second lightening hole 65. The second mounted hole 66b is located at a lower left position with respect to the second lightening hole 65. The third mounted hole 66c is located at a lower right position with respect to the second lightening hole 65.

A left end edge of the engine-side torque rod bracket 51 is provided, at the vertical center, with a first heat shield cover mounting portion 71 projecting leftward, and is provided, at a vertically lower end, with a second heat shield cover mounting portion 72 projecting leftward and downward. The first and second heat shield cover mounting portions 71 and 72 have cover mounting holes 73 and 74, respectively.

[Detailed Structure of Torque Rod 53]

Figure 4:
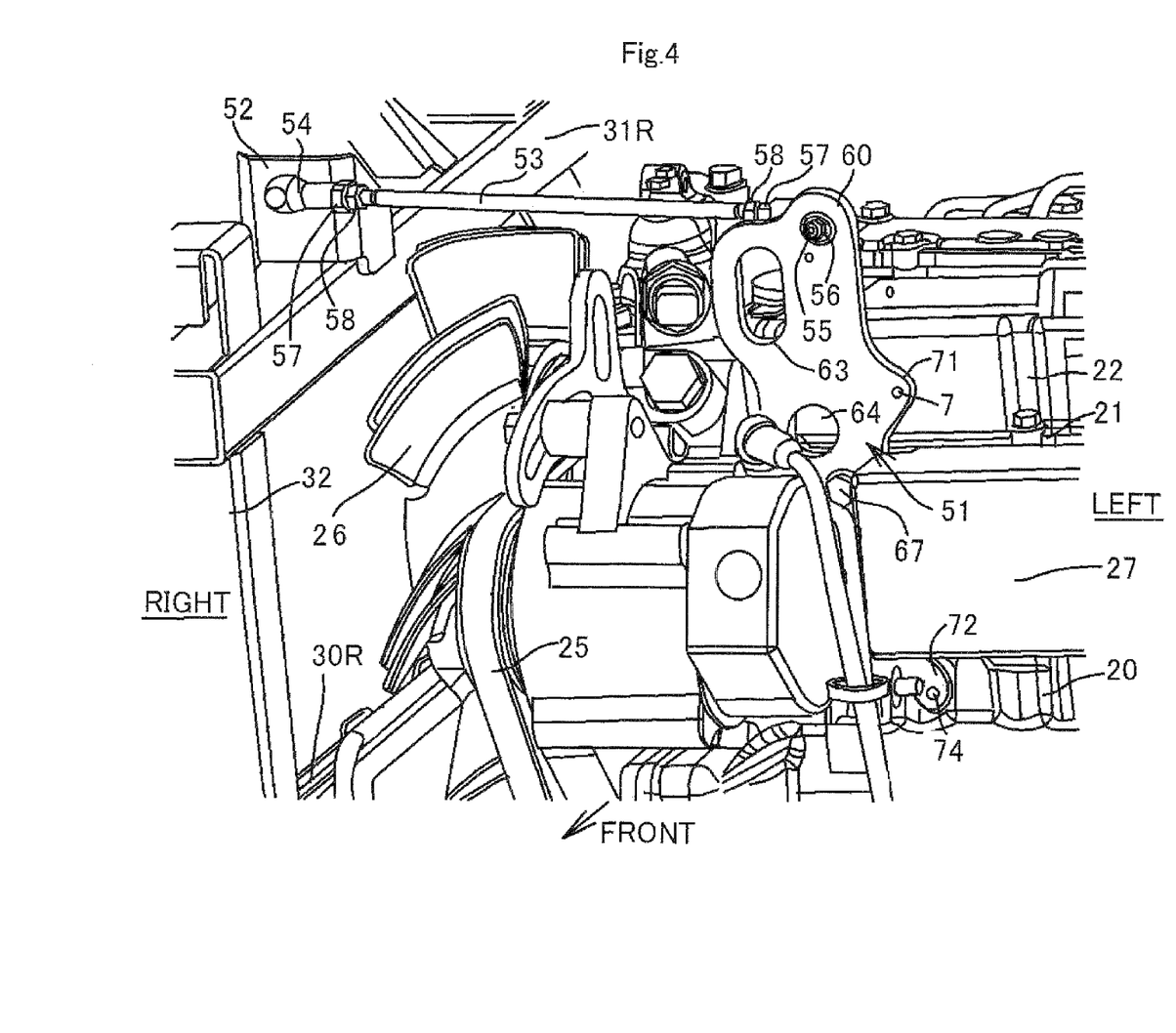
FIG. 4 is a perspective view viewed from upper front, of the upper end of the engine of the utility vehicle shown in FIG. 1.

With reference to FIG. 4, the engine-side torque rod bracket 51 has a plate shape expanding in the vertical direction and the vehicle width direction, and is mounted to the front surface of the cylinder head 21 by bolts 67 inserted through the first, second, and third mounted holes 66a, 66b, and 66c (see FIG. 5). The connecting boss portion 60 at the upper end of the engine-side torque rod bracket 51 is located above an upper end of the head cover 22. The frame-side torque rod bracket 52 projects upwardly from the upper surface of the right upper frame member 31R. The frame-side torque rod bracket 52 has a mounting surface that is located substantially as high as a mounting surface of the connecting boss portion 60 of the engine-side torque rod bracket 51. These mounting surfaces are included in substantially same vertical planes.

The torque rod 53 is located above an upper end of the engine cooling fan 26 and extends horizontally in the vehicle width direction. Both ends of the torque rod 53 in its extending direction are provided with pillow ball joints 54 respectively. Each of the pillow ball joints 54 is connected to the mounting surface of the frame-side torque rod bracket 52 and the mounting surface of the connecting boss portion 60 of the engine-side torque rod bracket 51. Each of the pillow ball joints 54 of the torque rod 53 is length-adjustable by adjusting a nut 57 and a locknut 58. The length of the torque rod 53 can be adjusted by unfastening the locknut 58 and turning the length adjusting nut 57.

Figure 6:
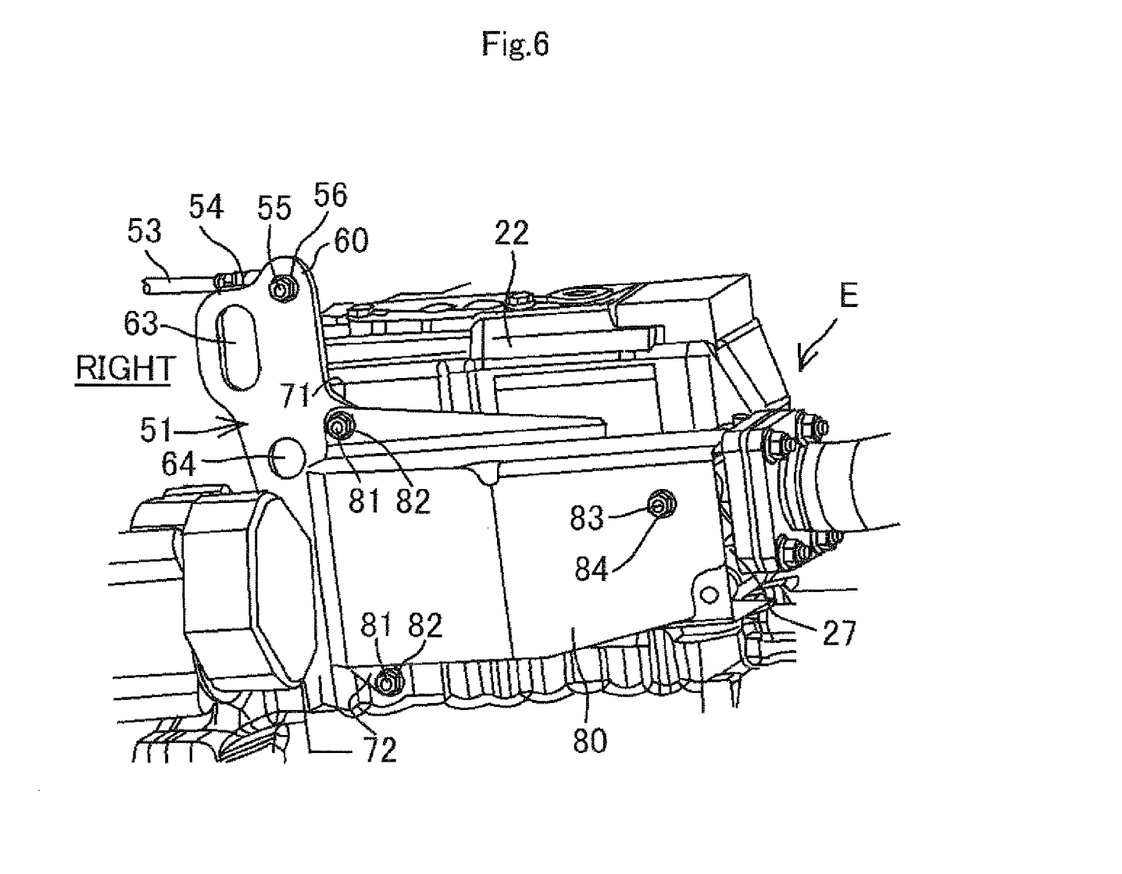
FIG. 6 is a perspective view of an engine similar to that in FIG. 4, with a heat shield cover of an exhaust manifold being attached thereto.

FIG. 6 shows the engine with a heat shield cover 80 of the exhaust manifold 27 being attached thereto. The heat shield cover 80 is located to cover a front portion and a top portion of the exhaust manifold 27. The upper right end and the lower right end of the heat shield cover 80 are mounted to the first heat shield cover mounting portion 71 and the second heat shield cover mounting portion 72 of the engine-side torque rod bracket 51 by bolts 81 and nuts 82, respectively. A left end of the heat shield cover 80 is mounted to the front surface of the exhaust manifold 27 by a bolt (anchor bolt) 83 and a nut 84.

[Functional Effects of the Embodiment]

(1) The torque rod 53 regulates rolling in the vehicle width direction of the engine E in operation. The torque rod 53 thus suppresses vertical vibration caused by rolling and improves riding comfort.

(2) The engine-side torque rod bracket 51 projects upward from the upper end of the head cover 22 of the engine E. The torque rod 53 is positioned higher than the upper end of the head cover 22 of the engine E, and is mounted to the engine-side torque rod bracket 51 and the frame-side torque rod bracket 52. There are fewer members interfering with the torque rod 53 to be located, and the torque rod 53 thus has wider flexibility in location.

(3) One of the ends of the torque rod 53 is mounted to the engine-side torque rod bracket 51 at a position above the head cover 22 of the engine E. This configuration thus achieves a long distance between the center of rolling of the engine E and the torque rod 53, and suppresses rolling of the engine E.

(4) The torque rod 53 is located to extend over the engine cooling fan 26. The torque rod 53 and the engine cooling fan 26 can be located so as not interfere with each other.

(5) The pillow ball joints 54 are provided at the opposite ends of the torque rod 53 in the extending direction. This configuration achieves dynamically reasonable mounting of the ends of the torque rod 53 to desired positions. This configuration also releases an excess load applied to the torque rod 53.

(6) The both ends of the engine E in the front-rear direction are supported by the first and second cross members 37 and 38 that extend in the vehicle width direction of the chassis frame 1. This configuration improves a vibration suppression effect on rolling of the engine E in the vehicle width direction.

(7) The engine-side torque rod bracket 51 has the engagement hole 63 configured to suspend the engine E. In other words, the engine-side torque rod bracket 51 also serves as an engine hanger. This configuration thus achieves sharing of components to reduce the number of components.

[Other Embodiments]

Figure 7:
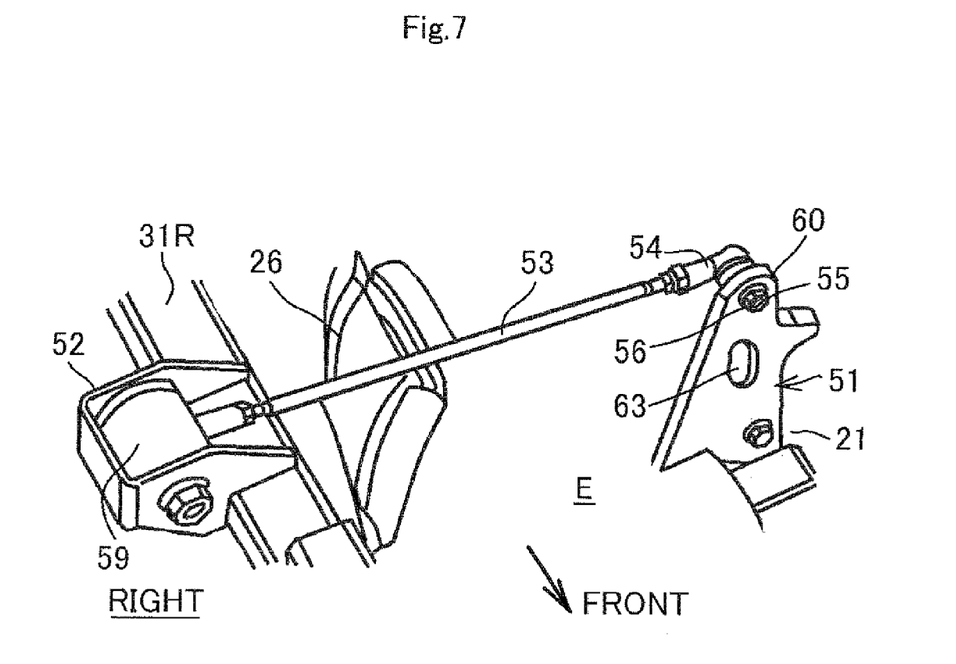
FIG. 7 is a perspective view of a torque rod of a utility vehicle, according to a modification example of the present invention.

(1) FIG. 7 shows a torque rod according to a first modification example of the present invention. One of the ends of the torque rod 53 is provided with a cylindrical rubber damper joint 59 in place of the pillow ball joint. The configuration according to the first modification example improves a vibration absorption effect on rolling of the engine E.

Figure 8:
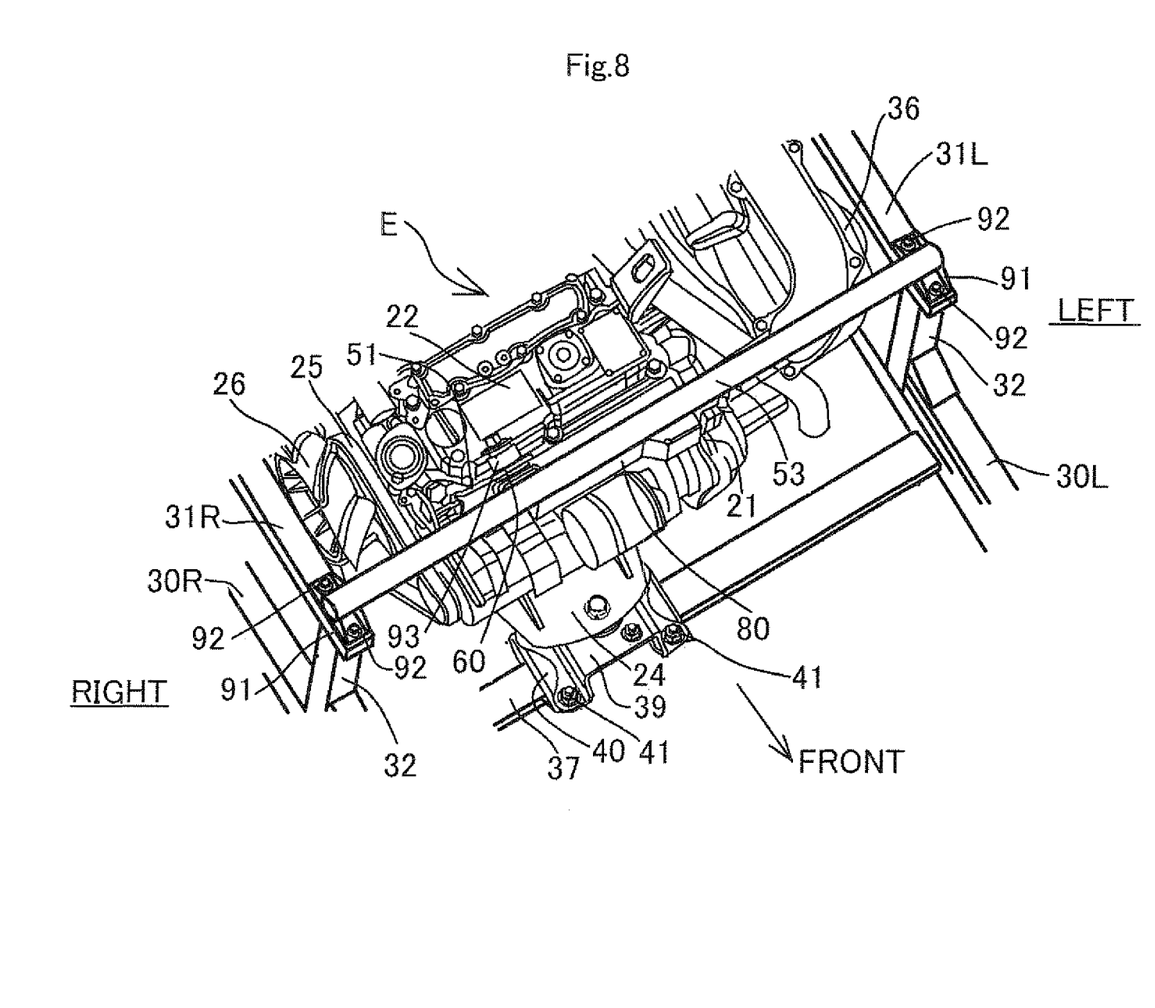
FIG. 8 is a perspective view of a torque rod of a utility vehicle, according to another modification example of the present invention.

(2) FIG. 8 shows a torque rod according to a second modification example of the present invention. The torque rod 53 is made of a pipe member having a circular shape in cross section, and also serves as a member of the chassis frame 1. More specifically, the torque rod 53 is located to extend in the vehicle width direction in parallel with the crank axis line O1, and the both ends of the torque rod 53 in the extending direction are fixed rigidly to the upper surfaces at the front ends of the right and left upper frame members 31R and 31L by brackets 91 and bolts 92. The engine-side torque rod bracket 51 is configured similarly to the torque rod bracket already described with reference to FIGS. 4 to 6, is fixed to the front surface of the cylinder head 21 and projects upward from the upper end of the head cover 22. The connecting boss portion 60 at the upper end of the engine-side torque rod bracket 51 is connected to a halfway position of the torque rod 53 in the extending direction, with a cylindrical rubber damper 93 being interposed therebetween.

The torque rod 53 according to the second modification example can stably receive the load of the engine E that is rolling clockwise or counterclockwise. This configuration improves the vibration suppression effect on rolling of the engine E. The torque rod 53 itself also serves a cross member of the chassis frame 1. The chassis frame 1 can be thus enhanced in rigidity.

(3) While the embodiment described above is applied to a utility vehicle equipped with a diesel engine, the present invention is also applicable to a utility vehicle equipped with a gasoline engine.

(4) While the above embodiment is applied to a utility vehicle having a front seat and a rear seat accommodated in a cabin, the present invention is also applicable to a utility vehicle having only a front seat. The cargo bed in this utility vehicle extends forward to a vicinity of the rear surface of the front seat, and the engine is located in a lower space at a front portion of the cargo bed.

(5) The utility vehicle according to the above embodiment has the front bench type seat and the rear bench type seat. The present invention is also applicable to a utility vehicle having a front seat row or a rear seat row including a plurality of bucket seats.

(6) The present invention is not limited to the configurations according to the embodiments described above, but can include various modifications devisable within the range not departing from the features recited in the following claims.

What is claimed is:

1. A utility vehicle comprising a chassis frame, at least one seat row, a cargo bed provided behind the at least one seat row, a cabin accommodating the at least one seat row, and an engine mounted to the chassis frame, the utility vehicle further comprising:

a torque rod bracket fixed to an engine body forming a shell of the engine, the torque rod bracket projecting upward from an upper end of the engine body; and a torque rod configured to suppress a rolling of the engine provided at a position higher than the upper end of the engine body, the torque rod connecting the torque rod bracket and a frame member, and the frame member being provided at one end of the chassis frame in a vehicle width direction.

2. The utility vehicle according to claim 1, wherein:

the engine includes an engine cooling fan at an end in the vehicle width direction, the engine cooling fan is located at an extending side of the torque rod, and the torque rod extends over the engine cooling fan.

3. The utility vehicle according to claim 1, wherein:

the torque rod has each end in an extending direction provided with a pillow ball joint.

4. The utility vehicle according to claim 3, wherein:

at least one of the pillow ball joints comprises a length adjusting nut, and a length of the torque rod can be adjusted by turning the length adjusting nut.

5. The utility vehicle according to claim 1, wherein:

the torque rod has one end in an extending direction provided with a pillow ball joint and the other end provided with a rubber damper joint.

6. The utility vehicle according to claim 4, wherein:

the pillow ball joint comprises a length adjusting nut, and a length of the torque rod can be adjusted by turning the length adjusting nut.

7. The utility vehicle according to claim 1, wherein:

the engine has each end in a front-rear direction of the utility vehicle supported by a cross member extending in the vehicle width direction of the chassis frame.

8. The utility vehicle according to claim 1, wherein:

the torque rod bracket is an engine hanger having an engagement portion configured to suspend the engine.

9. The utility vehicle according to claim 1, wherein:

the torque rod extends in the vehicle width direction and has ends in an extending direction mounted to the frame member at one end in the vehicle width direction and a frame member provided at the other end.

10. The utility vehicle according to claim 1, wherein:

a length of the torque rod can be adjusted.

* * * * *